2,899,484

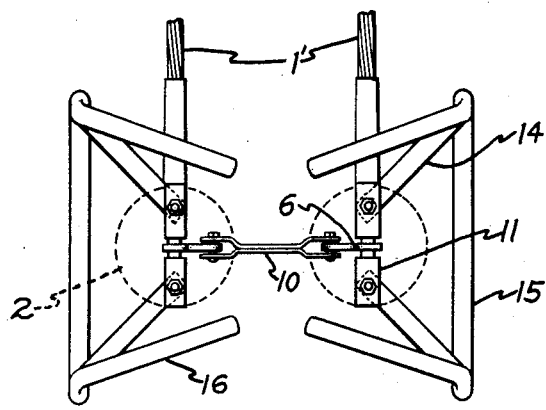
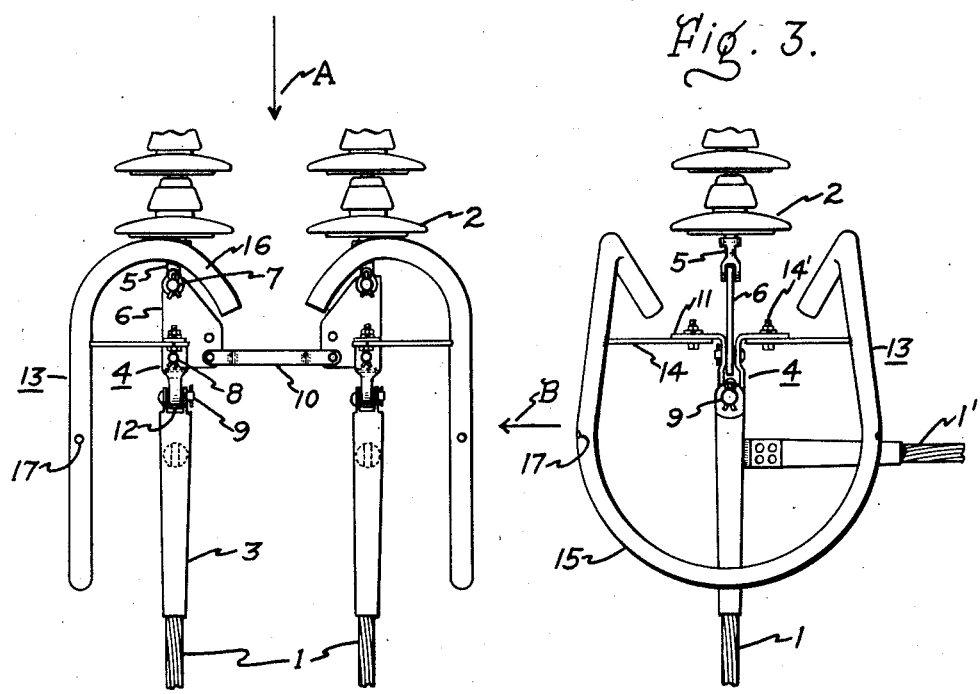
Fig. 1.
Fig. 3.
Fig. 2.
Inventors,
Robert L. McCoy,
Joseph Kaminski, Jr.,
by Gilbert P. Tarleton
Their Attorney United States Patent Office 2,899,484
Patented Aug. 11, 1959

SHIELDING MEANS FOR DEAD ENDED DOUBLE CONDUCTOR INSTALLATIONS

Robert L. McCoy, Ellicott City, and Joseph Kaminski, Jr., Baltimore, Md., assignors to General Electric Company, a corporation of New York Application December 9, 1957, Serial No. 701,517

8 Claims. (Cl. 174—144)

This invention relates to shielding means for high voltage electrical transmission line installations of the dead ended and tensioned type which utilize two conductors for each phase of electrical energy. By high voltage is meant transmission voltages of the order of 300 kv. (R.M.S.) line to line.

It is an object of this invention to provide an improved shielding means for a high voltage electrical transmission line installation of the dead ended and tensioned type which utilizes two conductors for each phase of electrical energy.

Shields of the type to which our invention relates should meet several requirements if they are to be satisfactory and perform their intended purposes. The tubing or other stock of the shields should have a sufficient radius so as to prevent corona formation on themselves, and, in effect, take the stress off the line hardware and clamps so that these parts can be of normal design. If the shield tubing does not have a sufficiently large radius for the intended operating voltage then the shields themselves will emit corona which will to a considerable degree destroy the benefits of shielding.

Another requirement for a satisfactory shield is that it serve as a voltage grading means for the line end of the insulator string. This is to reduce the stresses on the insulators which are adjacent to the end of the conductor. If a single shield is not able to perform both of these functions then separate shielding means would have to be provided for the line hardware and clamps and another shield for the insulators. Besides increasing costs, a pair of shields where one might do would be undesirable due to the difficulty of connecting a pair of shields within a limited area.

An additional requirement for a satisfactory shield is that it be easily maintained under hot line conditions. That is, the lineman should be able to remove the shield while the line is energized without danger to his safety and with relative convenience. Standard procedures and tools are provided for hot line maintenance. The shields and their manner of connection to the line should be such so that the standard procedures and tools can be used. The lineman should be able to reach all of the shields and connections from a single position. Hot line maintenance is done by a lineman when he is high in the air on a line pole or transmission tower. If he had to change his position in order to reach all of the shields and connections the arrangement would be unsatisfactory.

Additional requirements are that the installation be low cost and hav a minimum of loose and falling parts and the various parts be interchangeable. Loose and falling parts are undesirable since the lineman is high in the air, and interchangeability is desirable so as to reduce the number of different parts which have to be stocked.

In our invention we provide an improved shield means which meets the above discussed requirements and provides additional advantages which will be discussed hereinafter. In the preferred form of the invention a separate shield is provided for each conductor and it is connected to the clamp connector of its respective conductor so that the conductor clamp, clamp connector and other hardware of each conductor is at all times shielded to prevent the formation of corona. The shields are provided with curved portions which extend adjacent to the line ends of the insulator strings and in embracing relationship with respect to the line hardware. These curved portions are configured so that the shields at all times grade the voltage distribution on the insulators and provide corona protection for the hardware even though the conductors may be whipped about by high winds. The shields are connected to the conductors so that a lineman can do his hot line maintenance work from a line pole or tower structure with a long hot stick without changing his position. Also, the number of separate parts is kept to a minimum and corresponding parts for both conductors are made interchangeable. Furthermore, the ends of the shields are directed towards the parts which they are intended to shield which means that the shield ends and these parts are mutually shielding. This makes it unnecessary to provide special spheres or the like on the shield ends but they can be simply cut off at their ends. This contributes to the low cost of the shields and drains are provided when tubular stock is used so that the cut off ends do not need to be closed.

The feature of our invention which we believe to be novel are set forth with particularity in the appended claims. Our invention itself, however, both as to its organization and method of operation, together with further objects and advantages thereof, may be understood by reference to the following description taken in connection with the accompanying drawing, in which:

Fig. 1 is an end view of one form of our invention when looking in the direction of arrow A of Fig. 2; and Fig. 2 is a top view of the invention; and Fig. 3 is a side view when looking in the direction of arrow B of Fig. 2.

In the drawing the preferred form of our invention is illustrated as comprising a pair of generally horizontally disposed and spaced parallel conductors 1 which are connected to a pair of parallel and spaced electrical insulator strings 2 by a pair of conductor clamps 3 and other hardware. The clamps 3 can be of the compression or bolted type. The compression type is illustrated.

An insulator string is provided for each conductor and the conductor clamp 3 is connected to the insulator string by hardware which comprises a clamp connector 4, an insulator clevis 5, and a link or plate 6 which connects the connector 4 and clevis 5. The clevis 5 is pivoted to one end of the link 6 on a vertical axis by a pin 7 or the like, and the connector 4 is pivotally connected to the other end of link 6 on a vertical axis by a pin or the like 8. These two pivoted connections are such that the clevis 5, link 6 and connector 4 can pivot with respect to each in a generally horizontal plane.

The conductor clamp 3 is pivotally connected to the outer end of the connector 4 on a horizontal axis by a pin or the like 9. Accordingly, the conductors 1 are permitted a limited amount of up and down movement and sideways movement. Up and down movement of the conductors is provided by virtue of the pivoted connection 9 and sideways movement is provided by virtue of the pivoted connection 8. However, the conductors and the insulator strings are prohibited from being whipped together by a strut or the like 10 which spans and is pivotally connected to the links 6. Accordingly, the conductors are permitted some limited movement with respect to their insulator strings as well as with respect to each other.

The connector 4 is a generally narrow U-shaped member which has its opposite ends 11 bent away from each other. The connector 4 straddles one end of the link 6 and is pivotally connected thereto by passing the pin 8 through its legs and the end of the link 6. The closed bridge portion 12 of the connector 4 provides a seat for the pin 9 of the conductor clamp 3. The bent portions 11 of the connector 4 provide a pair of ears or tabs which extend above and below the horizontal plane of the link 6.

The shield 13 has a pair of straps or the like 14 connected thereto. The ends of the straps 14 are connected to the tabs or ears 11. The connection may comprise a pair of apertures which are formed in the ears 11 and pair of bolts or the like 14' which are welded to the straps 14 in order to reduce the number of loose and falling parts. The bolts register with the apertures and the connection is completed by a pair of lock nuts or the like. The bolts 14' point toward the remote ends of the insulator strings 2 so that the nuts can be reached by a lineman on a line pole or tower structure from a single position with a long hot stick for hot line maintenance work. The shields are so connected to the lines that they can be removed while the line is energized.

Since corresponding parts of both conductors are the same they are interchangeable. A pair of auxiliary conductors 1' extend from the clamps 3. They are for connecting the double conductors to another double conductors which are connected to the same line pole or tower. The general arrangement is illustrated in Fig. 1 of McCoy et al. Patent 2,741,321 and the conductors 1' can be suspended by means such as illustrated in our copending patent application Serial No. 664,064 which is assigned to the same assignee as the instant case.

The shield 13 is a curved and generally U-shaped member which has a curved bridge portion 15 and curved ends 16 which are curved away from the general plane of the shield 13. The curved portion 15 is made large enough to cover the area of the clamp 3, and the curved ends 16 are disposed adjacent to the lower end of the insulator strings 2 to grade the voltage distribution on the insulator strings. Also, the ends 16 are curved toward the strut 10 so as to provide corona protection for the hardware such as elements 4 to 12, 14 and 14'. The legs of the shield 13 also provide corona protection for these elements as well as the conductor clamp 3. Since the extremities of the curved ends 16 face and are disposed in the vicinity of the hardware which is being shielded, the hardware and extremities of the curved ends 16 are mutually shielding. If these extremities faced and were disposed in the vicinity of members which were at a different electrical potential from the hardware the extremities would have to be rounded off by spheres or the like. However, with the extremities being shielded by the hardware which is at the same potential it is possible to merely cut off the ends of the stock from which members 13 are constructed.

The shields 13 are disposed along the outer sides of the double conductor installation and extend generally from the lower electrical insulator to the outer end of the conductor clamps 3. Inasmuch as the shields 13 are directly connected to the connectors 4 the shields 13 will move in unison with the clamps 3 when the clamps 3 and their conductors 1 are moved sideways. This means that the clamps 3 will always be provided with corona protection even though the conductors 1 move sideways. The lower ends of the insulator strings will be provided with voltage grading and the other hardware will also be protected against corona during this sideways movement of the conductors 1 inasmuch as the curved portions 16 are long enough to cover their required protective area even though the shields 13 move in unison with the connectors 4. The curved portions 15 are large enough to cover the area through which the clamps 3 might be caused to pivot about the pin 9. Since the connector 4 cannot pivot in a vertical plane with respect to the link 6 the remaining portion of the shield 13 will provide corona protection for the other hardware as well as voltage grading for the lower ends of the insulator strings 2. If the conductors 1 are severely whipped in an up and down direction the whole installation will do likewise inasmuch as the lines are tensioned which means that the shields 13 will move in unison with the lines and hardware they are intended to protect.

For high voltages of the order of 300 kv. (R.M.S.) line to line, tubular stock for the shields 13 having a 1¼" iron pipe size (1.66" outer diameter) is satisfactory. In fact, this size is satisfactory for voltages as high as 345 kv. (R.M.S.) line to line. Of course, it will be appreciated that the exact size in any specific application will have to be correlated with the operating voltages and may also depend on the particular configuration given to the shield.

We prefer to use tubular stock since this reduces the weight and inertia added to the conductors. The necessity for closing the open extremities of the curved ends 16 is eliminated by providing drain holes 17 in lowermost and uppermost parts of the shields. A hole 17 is provided in each leg of the shields so that a drain will be provided without regard to whether a shield is used on the left or right hand side. If water enters the tubular stock through the open ends of the stock it will not be trapped and freeze therein and crack the tubular stock but it will drain out of the holes 17.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What we claim as new and desire to secure by Letters Patent of the United States is:

1. In a high voltage electrical transmission installation which comprises a pair of spaced and generally parallel electrical transmission lines for each phase of electrical energy, said lines being tensioned and disposed in generally the same horizontal plane, each of said lines comprising an elongated electrical conductor and an electrical insulator string which are interconnected by hardware, the hardware of each of said lines comprising a connector which is adapted to move in said plane with its conductor as its conductor moves sideways, corona suppressing and voltage grading means for said hardware and insulator strings, said means comprising a pair of shields which are removably connected to said connectors, each shield being adapted for movement in unison with its connector, and said shields extending along the outer sides of said hardware and the adjacent ends of said insulator strings.

2. In a high voltage electrical transmission installation as in claim 1, wherein said shields comprise generally U-shaped members which have curved bridge portions which are disposed adjacent the ends of said hardware which are remote from said insulator strings, and the ends of said members being curved away from said outer sides and extending to an area generally between said lines.

3. In a high voltage electrical transmission installation as in claim 2, wherein the connectors comprise generally narrow U-shaped members whose opposite ends are bent to extend away from each other in a direction generally above and below said plane, and said shields being supported from said bent ends by detachable means which are accessible from adjacent the remote end of said insulator strings.

4. In a pair of spaced and generally parallel electrical transmission lines which are disposed in the same generally horizontal plane, each of said lines comprising an elongated electrical conductor and a electrical insulator string which are interconnected by a set of hardware, said hardware set comprising a clamp connected to said conductor, a link connected to said insulator string on a vertical pivotal axis, a connector connected to said link on a vertical pivotal axis and to said clamp on a horizontal pivotal axis, the sets of hardware being independent of each other except for spacer means therebetween to keep said lines separated, and a pair of shields for suppressing corona on said hardware sets and grading the voltage distribution on said insulator strings, said shields being fastened to said connectors for movement in unison therewith.

5. In a high voltage electrical transmission installation which comprises a pair of spaced and generally parallel electrical transmission lines for each phase of electrical energy, said lines being tensioned and disposed in generally the same horizontal plane, each of said lines comprising an elongated electrical conductor and an electrical insulator string which are interconnected by hardware, and corona suppressing and voltage grading means for said hardware and insulator strings, said means comprising a pair of shields which are connected to said hardware for removal with a long hot stick while said conductors are energized, said shields being generally U-shaped members which are removably attached to said hardware by means which is accessible from adjacent the remote ends of said strings with a long hot stick.

6. In a high voltage electrical transmission installation as in claim 5, wherein said U-shaped members have extremities which are generally sharp and are disposed adjacent to said hardware for mutual shielding.

7. In a high voltage electrical transmission installation as in claim 5, wherein said U-shaped members are constructed from tubular stock, the ends of said tubular stock being cut off and open and facing and disposed adjacent to said hardware for mutual shielding, and apertures formed in said tubular stock for draining liquid from within said stock.

8. In a high voltage electrical transmission installation which comprises a pair of spaced and generally parallel electrical transmission lines for each phase of electrical energy, said lines being tensioned and disposed in generally the same horizontal plane, each of said lines comprising an elongated electrical conductor and an electrical insulator string which are interconnected by hardware, and corona suppressing and voltage grading means for said hardware and insulator strings, saids means comprising a pair of shields which are connected to said hardware, said shields comprising generally U-shaped members which are constructed from 1¼″ iron pipe size stock, the extremities of said U-shaped members being generally sharp and being disposed adjacent to said hardware for mutual shielding.

References Cited in the file of this patent

UNITED STATES PATENTS

| 2,741,322 | McCoy | Apr. 10, 1956 |

FOREIGN PATENTS

| 168,525 | Austria | June 25, 1951 |
| 170,196 | Austria | Jan. 25, 1952 |